US012595771B2

(12) United States Patent
Uchida

(10) Patent No.: US 12,595,771 B2
(45) Date of Patent: Apr. 7, 2026

(54) VEHICLE WITH ENGINE

(71) Applicant: TOYOTA JIDOSHA KABUSHIKI KAISHA, Toyota (JP)

(72) Inventor: Akito Uchida, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/005,191

(22) Filed: Dec. 30, 2024

(65) Prior Publication Data

US 2025/0270964 A1     Aug. 28, 2025

(30) Foreign Application Priority Data

Feb. 27, 2024     (JP) ................................. 2024-027621

(51) Int. Cl.
*F02D 31/00*          (2006.01)
*B60K 35/28*          (2024.01)

(52) U.S. Cl.
CPC ............ *F02D 31/001* (2013.01); *B60K 35/28* (2024.01); *B60K 2360/168* (2024.01)

(58) Field of Classification Search
CPC ............ F02D 31/001; F02D 2200/021; F02D 2200/101; F02D 2200/60; F02D 2200/606; F02D 2200/701; F02D 2200/702; G07C 5/0825; B60W 50/00
See application file for complete search history.

(56) References Cited

U.S. PATENT DOCUMENTS

| | | | | |
|---|---|---|---|---|
| 5,422,625 A | * | 6/1995 | Sakaemura | ............... B60Q 1/54 |
| | | | | 340/459 |
| 7,711,468 B1 | * | 5/2010 | Levy | .................... B60W 30/143 |
| | | | | 701/32.4 |
| 2009/0240396 A1 | * | 9/2009 | Sullivan | ................. B60K 35/22 |
| | | | | 116/286 |
| 2022/0258722 A1 | * | 8/2022 | Naito | ..................... B60W 10/02 |

FOREIGN PATENT DOCUMENTS

| | | | | |
|---|---|---|---|---|
| CN | 110281900 B | * | 4/2022 | ......... F16H 61/0213 |
| GB | 2554535 A | * | 4/2018 | ........ B60W 50/0098 |
| JP | 2005306198 A | * | 11/2005 | |
| JP | 2010-167827 A | | 8/2010 | |
| JP | 2015-199382 A | | 11/2015 | |
| WO | WO-02092394 A1 | * | 11/2002 | ............. B60K 35/20 |

* cited by examiner

*Primary Examiner* — Hung Q Nguyen
(74) *Attorney, Agent, or Firm* — OLIFF PLC.

(57)          ABSTRACT

A vehicle, with an engine, includes an engine control unit. The engine control unit is configured to control the engine in a circuit mode in which a traveling performance of the vehicle is improved, on a basis of a request transmitted from a portable terminal, when the portable terminal operated by a user of the vehicle determines that a current position of the vehicle equipped with the engine is in a circuit.

4 Claims, 6 Drawing Sheets

FIG. 5

| SWITCHING INFORMATION TABLE | | |
|---|---|---|
| ITEM NAME | NUMERIC | UNIT |
| SWITCHING TIMES | THREE | TIMES |
| SWITCHING YEAR #1 | 2023 | YEAR |
| SWITCHING MONTH #1 | 11th | MONTH |
| SWITCHING DAY #1 | 15th | DAY |
| SWITCHING YEAR #2 | 2023 | YEAR |
| SWITCHING MONTH #2 | 12th | MONTH |
| SWITCHING DAY #2 | 4th | DAY |
| SWITCHING YEAR #3 | 2024 | YEAR |
| SWITCHING MONTH #3 | 2nd | MONTH |
| SWITCHING DAY #3 | 20th | DAY |
| : | : | : |

VEHICLE WITH ENGINE

CROSS-REFERENCE TO RELATED APPLICATION

This application is based upon and claims the benefit of priority of the prior Japanese Patent Application No. 2024-027621, filed on Feb. 27, 2024, the entire contents of which are incorporated herein by reference.

TECHNICAL FIELD

The present disclosure relates to a vehicle with an engine.

BACKGROUND

A limiter is known to limit various functions for safety setting, fuel saving, and the like of a vehicle. As the various functions for safety setting, for example, a sideslip prevention function such as an anti-lock brake system is known. As a function for saving fuel, for example, a variable cylinder management system is known in which "one third or half" of an engine is automatically stopped depending on the traveling state to save fuel.

Further, a technique is known in which a current position of the vehicle is identified from data acquired by a global positioning system (GPS) and map information, and the amount of steering force assist is changed if a road is a circuit road. In addition, a technique is known in which the above-described limiter is released when it is determined that a vehicle is positioned in a circuit (see, for example, Japanese Unexamined Patent Application Publication No. 2015-199382).

Depending on the traveling state of the vehicle, the engine speed might increase beyond the maximum engine speed assumed at the time of design, that is, so-called over-revving might occur. In this case, engine components might be subjected to a stress greater than expected, which might reduce the durability of the components. For example, when the stress greater than expected is applied to the components such as a connecting rod, a piston, a cylinder head, or a camshaft of the engine, the durability of the components might be reduced. In order to suppress a decrease in durability of the components, the occurrence of over-revving may be limited by the limiter.

On the other hand, in a circuit mode for improving the traveling performance of the vehicle on the circuit road, it is also assumed that the limiter for limiting the occurrence of over-revving is released to increase the maximum engine speed. In this case, the deterioration of the durability of the components is not caused by the occurrence of over-revving, but is caused by the switching to the circuit mode based on the intention of a driver of the vehicle.

If the criterion for determining the occurrence of over-revving differs depending on whether or not the mode is switched to the circuit mode, it might be difficult to find a decrease in the durability of the components. For example, it is also assumed that the maximum engine speed is increased as described above in accordance with the switching to the circuit mode. However, when an initial first threshold for determining the occurrence of over-revving is changed to another second threshold at the same timing as the increase in the maximum engine speed, it might be difficult to determine the occurrence of over-revving.

SUMMARY

It is therefore an object of the present disclosure to provide a vehicle, with an engine, which uniquely determines occurrence of over-revving regardless of whether or not a circuit mode is switched.

The above object is achieved by a vehicle with an engine, the vehicle including an engine control unit configured to control the engine in a circuit mode in which a traveling performance of the vehicle is improved, on a basis of a request transmitted from a portable terminal, when the portable terminal operated by a user of the vehicle determines that a current position of the vehicle equipped with the engine is in a circuit, wherein, when a first maximum rotation speed of the engine is changed to a second maximum rotation speed higher than the first maximum rotation speed on a basis of the circuit mode, the engine control unit is configured to use a threshold associated with the first maximum rotation speed and used for determination of over-revving of the engine, regardless of a change from the first maximum rotation speed to the second maximum rotation speed.

The engine control unit may be configured to count a number of times that the circuit mode is switched each time switching to the circuit mode occurs, and to record first information associated with second information in any of storage devices provided in the vehicle, the first information may include a total number of times that the circuit mode is switched, the first information may be used for failure diagnosis of engine components of the engine, and the second information may include dates when the circuit mode is switched.

The vehicle may further include a display control unit configured to control display of a display device provided in a vehicle cabin of the vehicle, wherein the display control unit may be configured to change a boundary rotation speed from a first boundary rotation speed to a second boundary rotation speed higher than the first boundary rotation speed, on a basis of the change from the first maximum rotation speed to the second maximum rotation speed, the boundary rotation speed may be a speed between a first meter display region and a second meter display region on a high rotation speed side adjacent to the first meter display region, and the first and second meter display regions may indicate a rotation speed of the engine.

BRIEF DESCRIPTION OF THE DRAWINGS

FIG. 5 illustrates an example of a switching information table; and

DETAILED DESCRIPTION

Hereinafter, embodiments of the present disclosure will be described with reference to the drawings.

Figure 1:
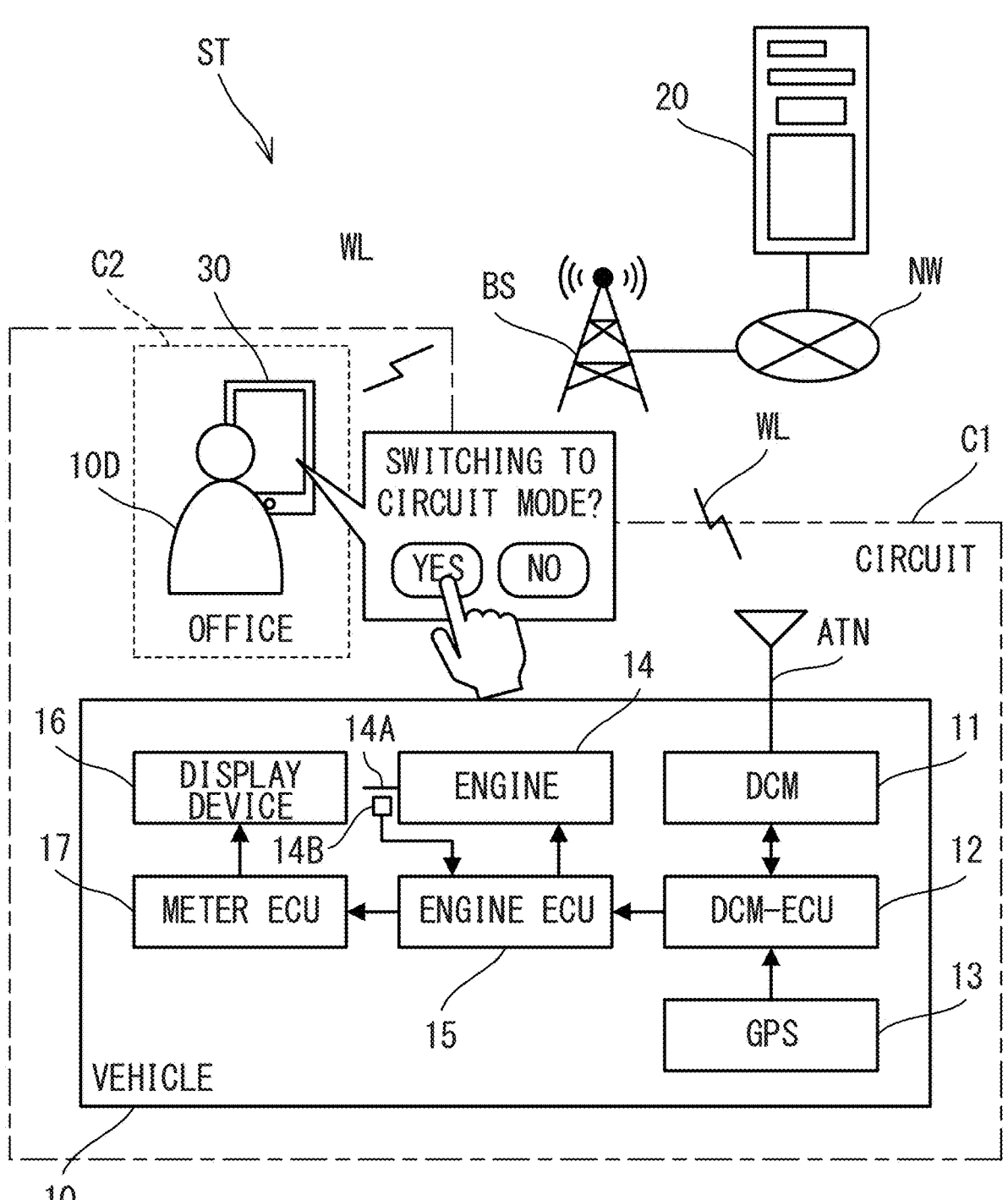
FIG. 1 illustrates an example of a vehicle control system.

As illustrated in FIG. 1, a vehicle control system ST includes a vehicle 10, a server 20, and a portable terminal 30. Although a smartphone is illustrated as an example of the portable terminal 30 in FIG. 1, a tablet terminal may be used instead of the smartphone. The vehicle 10, the server 20, and the portable terminal 30 cooperate with one another, whereby the vehicle control system ST provides a service limited to a circuit C1 to a driver 10D who is a user of the vehicle 10.

For example, when the vehicle 10 enters the circuit C1 and the driver 10D operates the portable terminal 30 in an office C2 of the circuit C1 to activate a circuit application, the portable terminal 30 acquires GPS information including a current position of the vehicle 10 via the server 20. The circuit application is application software installed in the portable terminal 30 and is associated with the vehicle 10. The circuit application is used when the vehicle 10 is controlled in a circuit mode for improving the traveling performance of the vehicle 10.

The vehicle 10 includes a data communication module (DCM) 11 as a wireless communication device to which an antenna ATN is connected, a DCM-electronic control unit (ECU) 12, and a GPS 13. The DCM-ECU 12 controls communication between the portable terminal 30 and the engine ECU 15 described later. The GPS 13 measures positions of the vehicle 10 and holds GPS information including the measured positions. The DCM-ECU 12 acquires the GPS information from the GPS 13, and transmits the GPS information to the server 20 by radio wave WL via the GPS and the antenna ATN. Therefore, when the server 20 requests the vehicle 10 to transmit the GPS information, the server 20 acquires the GPS information from the vehicle 10.

The GPS information reaches the server 20 via a base station BS and a communication network NW. The communication network NW includes one or both of the Internet and a local area network (LAN). When the portable terminal 30 requests the server 20 to transmit the GPS information, the server 20 transmits the GPS information to the portable terminal 30 by the radio wave WL via the communication network NW and the base station BS. Thus, the portable terminal 30 acquires the GPS information of the vehicle 10.

The server 20 also holds map information (hereinafter referred to as circuit information) including the position or area of the circuit C1. When the portable terminal 30 requests the server 20 to transmit the circuit information, the server 20 transmits the circuit information to the portable terminal 30 by the radio wave WL via the communication network NW and the portable base station BS. Thus, the portable terminal 30 acquires the circuit information.

When the portable terminal 30 acquires the GPS information and the circuit information, the portable terminal 30 determines whether a current position of the vehicle 10 is within the circuit C1 or not on the basis of the circuit information and the GPS information. When the vehicle 10 is not located in the circuit C1, the portable terminal 30 rejects the switching to the circuit mode and presents the rejection to the driver 10D on the screen.

On the other hand, when the vehicle 10 is located in the circuit C1, the portable terminal 30 presents a notice about the switching to the circuit mode to the driver 10D, and requests the driver 10D to accept the switching. In this way, in the circuit mode, it is determined whether or not the position of the vehicle 10 is within the circuit C1. Therefore, the circuit mode is different from a sport mode (or a sport traveling mode) in which the traveling performance is improved only by switching of a switch provided in the vehicle cabin of the vehicle 10 without performing such determination.

When the portable terminal 30 receives the acceptance of the switching from the driver 10D, the portable terminal 30 transmit circuit-mode request information (hereinafter, referred to as request ID (Identifier)) including the acceptance of the switching to the server 20. The request ID is identification information for requesting the vehicle 10 to switch to the circuit mode. The request ID is prepared and defined for each version of the circuit application. Therefore, when the version of the circuit application is updated by version upgrade, different independent request ID is transmitted based on the update of the version.

When the request ID is transmitted from the portable terminal 30, the server 20 generates switching information including the request ID and transmits the switching information to the vehicle 10. The switching information is information for switching the traveling performance of the vehicle 10 to traveling performance specialized for traveling in the circuit C1, which will be described in detail later. For example, the server 20 transmits the switching information to the vehicle 10 by a short message service (SMS).

In the vehicle 10, the DCM-ECU 12 receives the switching information from the server 20 via the DCM 11 and the antenna ATN. The vehicle 10 includes an engine 14, an engine ECU 15, a display device 16, and a meter ECU 17. The engine ECU 15 is an example of an engine control unit. The meter ECU 17 is an example of a display control unit. An engine speed sensor 14B is provided in the vicinity of a crankshaft 14A of the engine 14. The engine speed sensor 14B detects the rotation speed of the crankshaft 14A as the engine rotation speed. The display device 16 is provided in the vehicle cabin of the vehicle 10. The DCM-ECU 12, the engine ECU 15, and the meter ECU 17 achieves a control device of the vehicle 10.

When the DCM-ECU 12 receives the switching information, the DCM-ECU 12 transmits the switching information to the engine ECU 15 by using a controller area network (CAN) signal. Thus, the engine ECU 15 receives the switching information. When receiving the switching information, the engine ECU 15 determines whether or not both of a first condition and a second condition, which are a part of all of at least three or more conditions for stably burning fuel supplied to the engine 14 in the circuit mode, are unsatisfied.

For example, the at least three conditions include the first condition related to a temperature of a coolant that cools the engine 14, the second condition related to an atmospheric pressure, and a third condition related to an injection amount of the fuel supplied to the engine 14. The at least three conditions may include, for example, a fourth condition related to a rotation speed of the engine 14, a fifth condition related to a temperature of an outside air, and a sixth condition related to communication between the DCM-ECU 12 and the engine ECU 15. The engine ECU 15 determines whether or not, for example, both of the first condition and the second condition are unsatisfied among the first to sixth conditions. In this way, the engine ECU 15 determines whether both the first and second conditions are satisfied or not. Therefore, the engine ECU 15 reduces the number of adaptation steps as compared with the case where it is determined whether or not all the conditions from the first to sixth conditions are adapted.

Here, when either one of the first condition and the second condition is satisfied, the engine ECU 15 permits the switching to the circuit mode. Thus, the engine ECU 15 changes the control of the engine 14 based on the request ID included in the switching information. That is, the engine ECU 15 controls the engine 14 in the circuit mode. For example, the engine ECU 15 changes a first maximum rotation speed for preventing the occurrence of over-revving to a second maximum rotation speed higher than the first maximum rotation speed. Thus, the engine 14 is operated in, for example, the circuit mode in which the engine speed is increased.

The engine ECU 15 changes a torque upper limit map (hereinafter, simply referred to as torque map) that defines an upper limit of the torque of the engine 14. Thus, the engine 14 is operated in the circuit mode in which high torque is output. The circuit mode improves the traveling performance of the vehicle 10 as compared to the normal traveling mode. In this way, the use of the circuit mode is accepted, and thus the service of conveying the enjoyment of the motor sports to the driver 10D is provided.

On the other hand, when both the first condition and the second condition are unsatisfied, the engine ECU 15 rejects the switching to the circuit mode. In this case, the engine ECU 15 notifies the portable terminal 30 of the switching error via the DCM-ECU 12, the server 20, or the like. Thus, the driver 10D confirms that the switching to the circuit mode is rejected.

When the engine ECU 15 changes the control of the engine 14, the engine ECU 15 transmits meter display control information to the meter ECU 17. The meter display control information is information for controlling a display of a tachometer provided in the display device 16. For example, when the engine ECU 15 changes the torque map, the engine ECU 15 generates meter display control information and transmits the meter display control information to the meter ECU 17. The meter ECU 17 controls the display of the tachometer based on the meter display control information. When the use of the circuit mode is selected, a boundary rotation speed between a first meter display region and a second meter display region on the high rotation speed side adjacent to the first meter display region is increased to the high rotation speed side. The first and second meter display regions indicate the rotation speed of the engine 14.

Thus, the meter display is shifted from the normal traveling mode to the circuit mode. As a result, the driver 10D recognizes that the circuit mode is selected. Thus, by selecting the use of the circuit mode, the vehicle control system ST provides a service that conveys the fun of motor sports to the driver 10D.

Next, the portable terminal 30 will be described in detail with reference to FIG. 2A.

Figures 2A, 2B:
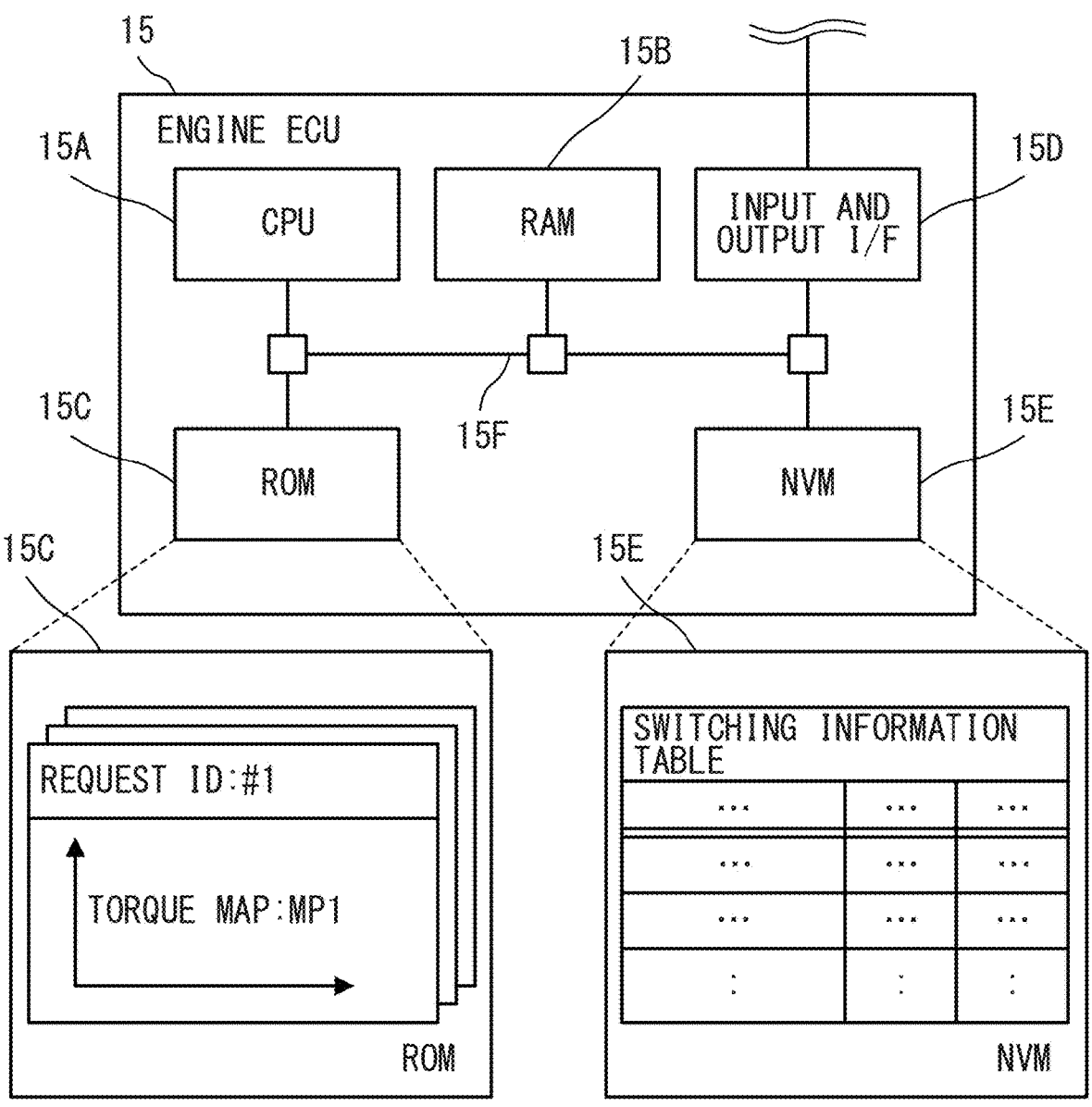
FIG. 2A is an example of a correspondence table held by a mobile device.
FIG. 2B illustrates an example of a hardware configuration of an engine ECU.

As illustrated in FIG. 2A, the portable terminal 30 includes a non-volatile memory (NVM) 31. The NVM 31 stores a correspondence table of version IDs for identifying the versions of the circuit applications and request IDs. For example, the request ID "#1" is associated with the version ID "Ver1". The request ID "#2" is associated with the version ID "Ver2". Thus, when the version of the application is updated from, for example, "Ver1" to "Ver2", the portable terminal 30 transmits the request ID "#2".

Next, the engine ECU 15 will be described in detail with reference to FIG. 2B. Hardware configurations of the DCM-ECU 12 and the meter ECU 17 are basically the same as the hardware configuration of the engine ECU 15, and thus detailed description thereof will be omitted. The engine ECU 15 indirectly communicates with the portable terminal 30 via the DCM-ECU 12, the server 20, or the like.

The engine ECU 15 is a hardware circuit including a central processing unit (CPU) 15A, a random access memory (RAM) 15B, a read only memory (ROM) 15C, an input and output interface (I/F) 15D, and a NVM 15E. The NVM 15E includes, for example, a Nanotube RAM (NRAM). The CPU 15A is an example of a processor and indirectly communicates with the portable terminal 30. The CPU 15A, the RAM 15B, the ROM 15C, the input and output I/F 15D, and the NVM 15E are connected to one another via an internal bus 15F. Although omitted in FIG. 2B, the input and output I/F 15D is connected to the DCM-ECU 12, the engine 14, and the meter ECU 17. At least the CPU 15A and the RAM 15B cooperate with each other to achieve a computer.

In the RAM 15B mentioned above, the software pre-stored in the ROM 15C is stored by the CPU 15A. The CPU 15A executes the stored software, and thus the CPU 15A executes a series of processes described later. The software may be in accordance with a processing sequence diagram described later.

The ROM 15C stores a plurality of torque maps for the respective request IDs. Each of the torque maps defines the upper limit of the torque of the engine 14. The request IDs are prepared and defined for respective versions of the circuit application. That is, the plurality of torque maps are stored in the ROM 15C for respective versions of the circuit application.

On the other hand, the NVM 15E stores a switching information table. The switching information table stores switching information including the number of times that the circuit mode is switched, dates when the circuit mode is switched, and the like. For example, in a repair shop of the vehicle 10, a service person operates a device for diagnosing a failure or a malfunction of the engine 14 to acquire the switching information from the NVM 15E. In this way, the switching information is used for diagnosing a decrease in durability of components of the engine 14 and a failure of the components. The switching information may improve the accuracy of identifying a decrease in the durability of the component and the accuracy of diagnosing a failure, as compared with a case where the presence or absence of switching remains as a history.

Figure 3:
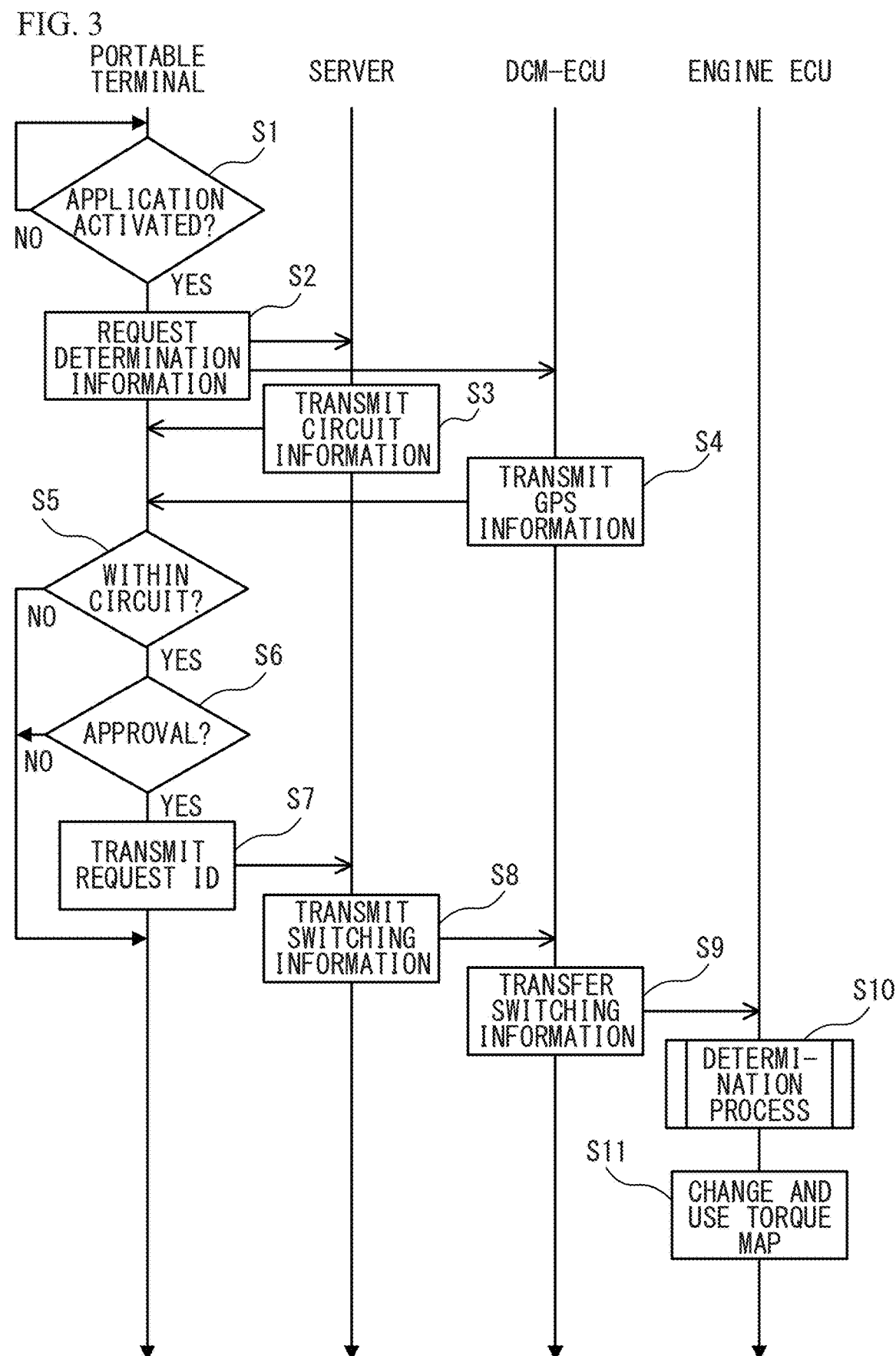
FIG. 3 is a processing sequence diagram illustrating an example of an operation of the vehicle control system.

Next, the operation of the vehicle control system ST will be described with reference to FIG. 3.

First, the portable terminal 30 waits until the circuit application is activated (step S1: NO). For example, the portable terminal 30 waits until the driver 10D performs a predetermined operation to instruct activation of the circuit application on the icon of the circuit application displayed on the portable terminal 30. When a predetermined operation is performed on the icon of the circuit application and the circuit application is activated (step S1: YES), the portable terminal 30 requests the server 20 and the DCM-ECU 12 for determination information (step S2). The determination information is information for determining whether or not the position of the vehicle 10 is within the circuit C1.

For example, the portable terminal 30 directly requests the server 20 to transmit the determination information. On the other hand, the portable terminal 30 indirectly requests the DCM-ECU 12 for the determination information. That is, the portable terminal 30 requests the DCM-ECU 12 for the determination information via the server 20. When the determination information is requested from the portable terminal 30, the server 20 transmits the circuit information as the determination information to the portable terminal 30 (step S3). When the determination information is requested from the portable terminal 30 via the server 20, the DCM-ECU 12 transmits the GPS information as the determination information to the portable terminal 30 via the server 20 (step S4).

When the portable terminal 30 acquires the GPS information and the circuit information, the portable terminal 30 determines whether the current position of the vehicle 10 is within the circuit C1 (step S5). If the current position is not within the circuit C1 (step S5: NO), the portable terminal 30 skips the subsequent processing. In this case, the portable terminal 30 rejects the switching to the circuit mode, and thus the control of the vehicle 10 in the circuit mode is stopped.

On the other hand, when the current position is within the circuit C1 (step S5: YES), the portable terminal 30 determines whether or not there is an approval for switching to the circuit mode (step S6). For example, the portable terminal 30 presents a notice about the switching to the circuit mode to the driver 10D on the screen of the portable terminal 30, and requests the driver 10D to accept the switching. The notice includes, for example, an explanation about a decrease in durability of a component of the engine 14, an explanation about deterioration of the engine 14, and the like. When the driver 10D performs an operation to reject the switching to the circuit mode, the portable terminal 30 determines that the driver 10D does not accept the switching to the circuit mode (step S6: NO). In this case, the portable terminal 30 rejects the switching to the circuit mode, and thus the control of the vehicle 10 in the circuit mode is stopped.

On the other hand, when the driver 10D performs an operation of accepting the switching to the circuit mode (for example, pressing of a "YES" button as illustrated in FIG. 1), the portable terminal 30 determines that the acceptance of the switching to the circuit mode is made (step S6: YES). In this case, the portable terminal 30 transmits the request ID to the server 20 (step S7). Specifically, the portable terminal 30 checks the version ID for identifying the version of the current circuit application installed in the portable terminal 30, and specifies and transmits the request ID corresponding to the version ID. For example, if the version of the circuit application identified by the version ID "Ver2" is installed in the portable terminal 30, the portable terminal 30 transmits the request ID "#2".

When the server 20 receives the request ID, the server 20 transmits the switching information to the DCM-ECU 12 (step S8). Specifically, when the server 20 receives the request ID, the server 20 generates the switching information including the received request ID and transmits the switching information to the DCM-ECU 12. When the DCM-ECU 12 receives the switching information, the DCM ECU 12 transfers the switching information to the engine ECU 15 (step S9).

When the engine ECU 15 receives the switching information, the engine ECU 15 performs a determination process (step S10). The determination process is a process of determining whether both of the first condition and the second condition among the at least three conditions are unsatisfied. The determination process will be described in detail later. When one of the first condition and the second condition is satisfied, the engine ECU 15 changes the torque map and immediately uses the changed torque map (step S11). Specifically, when one of the first condition and the second condition is satisfied, the engine ECU 15 extracts the request ID from the switching information, and specifies and selects the torque map corresponding to the extracted request ID. For example, when the request ID "#2" is extracted, the engine ECU 15 specifies and selects one of the plurality of torque maps associated with the request ID "#2".

If the torque map associated with the request ID "#1" is used before the switching information is received, the engine ECU 15 changes the torque map to the torque map associated with the request ID "#2". When the engine ECU 15 changes the torque map, the engine ECU 15 uses the changed torque map for controlling the vehicle 10.

Figure 4:
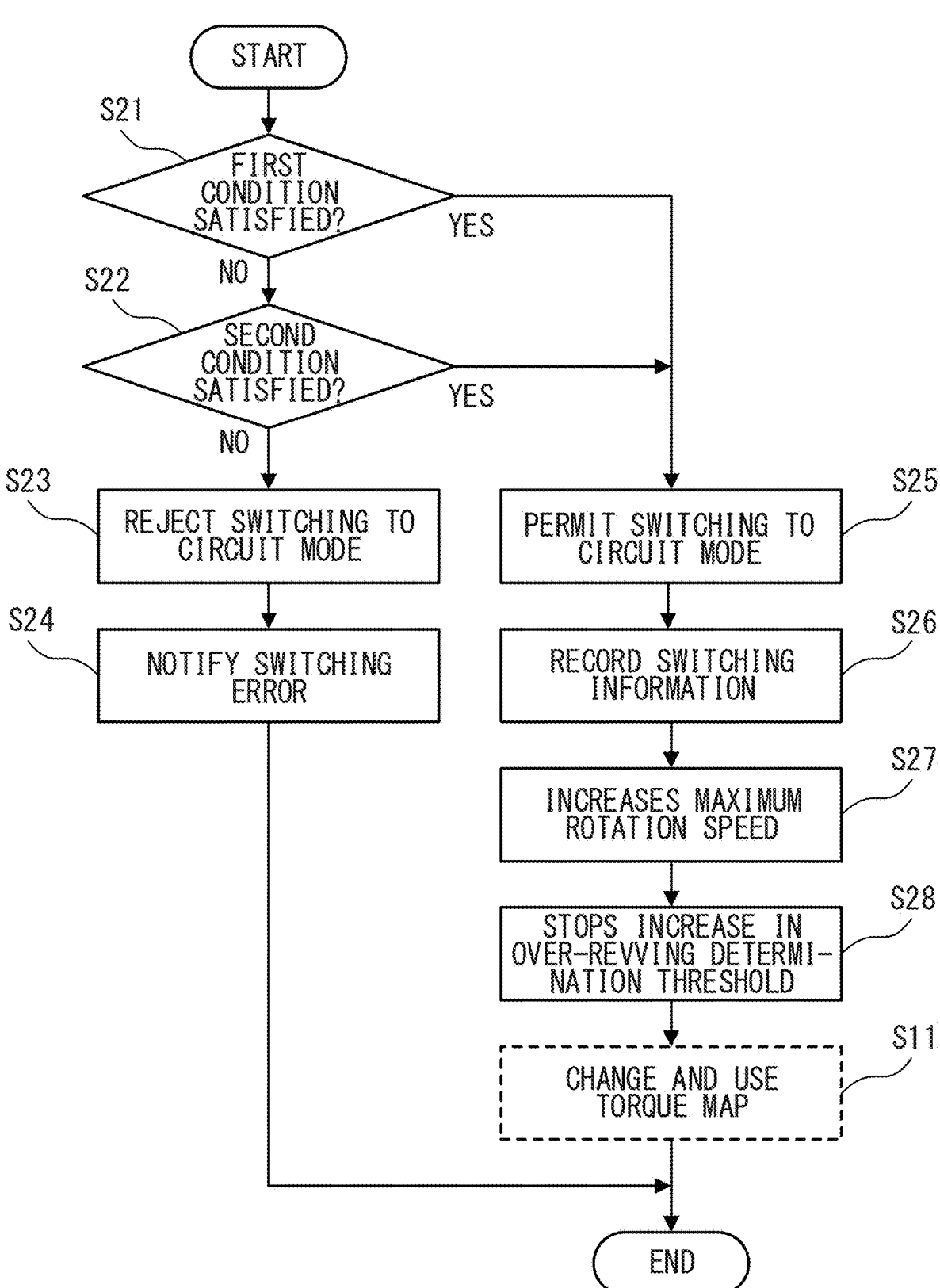
FIG. 4 is a flowchart illustrating an example of a determination process.

The details of the determination process will be described with reference to FIG. 4.

As described above, when the engine ECU 15 receives the switching information, the engine ECU 15 determines whether or not the first condition is satisfied (step S21). For example, the engine ECU 15 determines whether the temperature of the coolant that cools the engine 14 is equal to or higher than a temperature threshold as the first condition. The temperature threshold is set to a temperature at which the fuel supplied to the engine 14 is stably combusted, based on design, experiments, and the like.

When the first condition is not satisfied because the coolant temperature is lower than the temperature threshold (step S21: NO), the engine ECU 15 then determines whether or not a second condition is satisfied (step S22). For example, the engine ECU 15 determines whether or not an atmospheric pressure is equal to or higher than a pressure threshold as the second condition. The pressure threshold is set to a pressure at which the fuel supplied to the engine 14 is stably combusted, based on design, experiments, and the like.

If the second condition is not satisfied because the atmospheric pressure is lower than the pressure threshold (step S22: NO), the engine ECU 15 rejects the switching to the circuit mode (step S23). That is, when both the first condition and the second condition are unsatisfied, the engine ECU 15 might not be able to stably burn the fuel supplied to the engine 14. In such a case, the engine ECU 15 rejects the switching to the circuit mode because the control of the engine 14 in the circuit mode might not be suitable.

If the switching to the circuit mode is rejected, the engine ECU 15 notifies a switching error (step S24), and the determination process ends. Specifically, the engine ECU 15 notifies the portable terminal 30 of the switching error. The switching error reaches the portable terminal 30 via the DCM-ECU 12, the server 20, and the like. Thus, the driver 10D confirms that the switching to the circuit mode is rejected. When the switching to the circuit mode is rejected, the engine ECU 15 skips the process of step S11 described above.

On the other hand, when either the first condition or the second condition is satisfied (step S21: YES, step S22: YES), the engine ECU 15 permits the switching to the circuit mode (step S25). That is, when the first condition is satisfied because the coolant temperature is equal to or higher than the temperature threshold, the engine ECU 15 permits the switching to the circuit mode. When the second condition is satisfied because the atmospheric pressure is equal to or higher than the pressure threshold, the engine ECU 15 permits the switching to the circuit-mode.

When the switching to the circuit mode is permitted, the engine ECU 15 records the switching information (step S26). Specifically, the engine ECU 15 counts the number of times that the circuit mode is switched each time switching to the circuit mode occurs. When counting the number of times of switching, the engine ECU 15 records first information including the total number of times of switching and second information including a switching date in association with each other as switching information. The CPU 15A stores the switching information in the NVM 15E, so that the engine ECU 15 records the switching information.

As a result, as illustrated in FIG. 5, the engine ECU 15 holds the total number of times of switching and the dates of switching as a history each time switching to the circuit mode occurs. The engine ECU 15 may record the switching information in any of the plurality of storage devices provided in the vehicle 10. For example, the CPU 15A of the engine ECU 15 may record the switching information in an NVM included in the DCM-ECU 12 or the meter ECU 17.

When the switching information is recorded, the engine ECU 15 increases the maximum rotation speed of the engine 14 (step S27). That is, the engine ECU 15 changes the first maximum rotation speed to a second maximum rotation speed higher than the first maximum rotation speed. When the maximum engine speed is increased, the engine ECU 15 stops an increase in an over-revving determination threshold used for a determination of the over-revving (step S28). That is, the engine ECU 15 maintains and uses the original over-revving determination threshold set at the time of design. An original over-revving determination threshold is set to, for example, the same value as the first maximum rotation speed. On the other hand, a value close to the first maximum rotation speed may be set as the over-revving determination threshold as long as the over-revving determination threshold is within a range in which the over-revving is determined. In this way, the original over-revving determination threshold is associated with the first maximum rotation speed.

Even if the engine ECU 15 increases the over-revving determination threshold at the same timing of increasing the maximum rotation speed of the engine 14, the over-revving determination threshold is maintained at the original value at the time of design and used by the process in step S28. Thus, the occurrence of over-revving is uniquely determined regardless of the presence or absence of switching to the circuit mode. When the engine ECU 15 stops increasing the over-revving determination threshold, the engine ECU 15 executes the process of step S11 described above, and the determination process ends.

In this way, when the switching to the circuit mode is permitted, the engine ECU 15 changes the first maximum rotation speed of the engine 14 to the second maximum rotation speed higher than the first maximum rotation speed. In this case, the engine ECU 15 maintains the over-revving determination threshold used for the over-revving determination of the engine 14 and associated with the first maximum rotation speed, regardless of a change from the first maximum rotation speed to the second maximum rotation speed. Thus, the engine ECU 15 uniquely determines the occurrence of the over-revving regardless of the presence or absence of the switching to the circuit mode.

The engine ECU 15 counts the number of times of the switching each time switching to the circuit mode occurs. When the engine ECU 15 counts the number of times of switching, the engine ECU 15 associates the total number of times of switching used for failure diagnosis of the components of the engine with the switching date, and records the total number of times of switching as switching information in the engine ECU 15 itself. By acquiring and analyzing the switching information, a decrease in the durability of the components of the engine 14 is found early. In addition, by acquiring and analyzing the switching information, a failure of a component is found early.

Figure 6A:
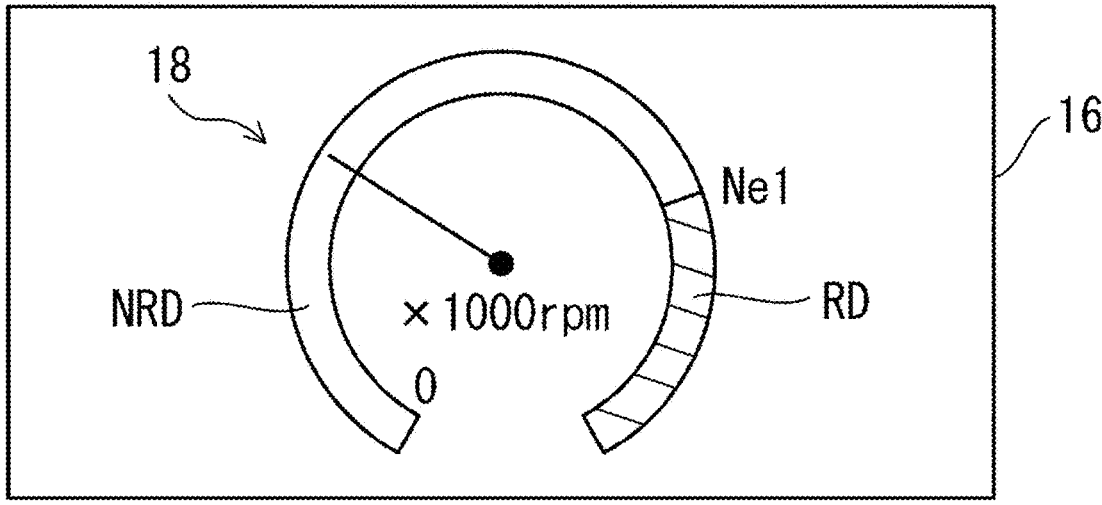
FIG. 6A illustrates an example of a tachometer in a normal traveling mode.

The meter ECU 17 controls the display of the tachometer displayed on the display device 16 on the basis of a change from the first maximum rotation speed to the second rotation speed. For example, as illustrated in FIG. 6A, in the normal traveling mode, a boundary rotation speed between a non-red zone NRD and a red zone RD of a tachometer 18 may be set to a first maximum rotation speed Ne1.

Figure 6B:
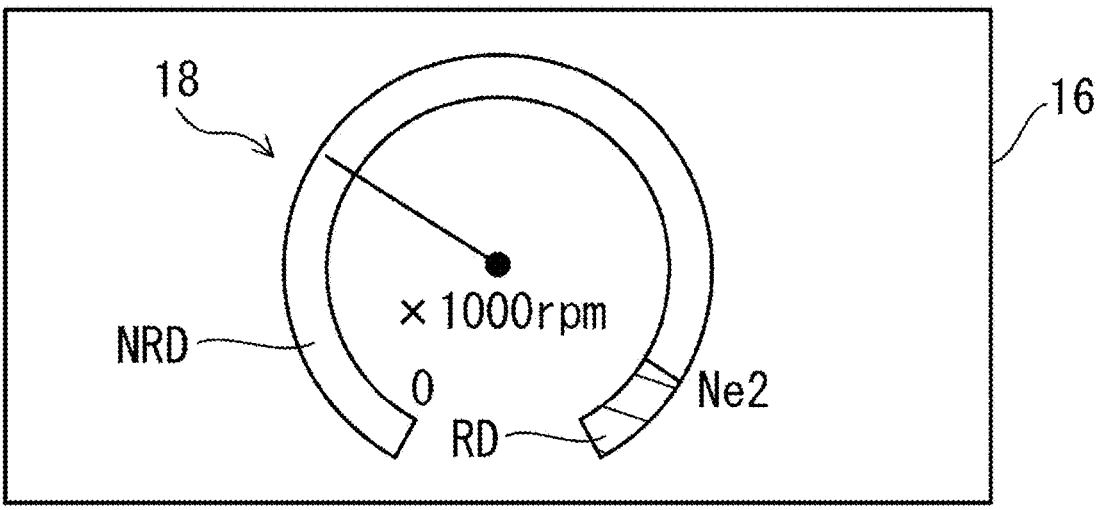
FIG. 6B illustrates an example of a tachometer in a circuit mode.

In this case, when the switching to the circuit mode is permitted, the boundary rotation speed between the non-red zone NRD and the red zone RD of the tachometer 18 is set to the second maximum rotation speed Ne2 as illustrated in FIG. 6B. That is, the meter ECU 17 changes the boundary rotation speed between the non-red zone NRD and the red zone RD to the high rotation speed side. Thus, the driver 10D instantly confirms that the circuit mode is switched. In other words, the driver 10D does not misunderstand that the circuit mode is not switched.

Although some embodiments of the present disclosure have been described in detail, the present disclosure is not limited to the specific embodiments but may be varied or changed within the scope of the present disclosure as claimed.

What is claimed is:

1. A vehicle with an engine, the vehicle comprising
an engine control unit configured to control the engine in a circuit mode in which a traveling performance of the vehicle is improved, on a basis of a request transmitted from a portable terminal, when the portable terminal operated by a user of the vehicle determines that a current position of the vehicle equipped with the engine is in a circuit,
wherein, when a first maximum rotation speed of the engine is changed to a second maximum rotation speed higher than the first maximum rotation speed on a basis of the circuit mode, the engine control unit is configured to use a threshold associated with the first maximum rotation speed and used for determination of over-revving of the engine, regardless of a change from the first maximum rotation speed to the second maximum rotation speed.

2. The vehicle with the engine according to claim 1, wherein
the engine control unit is configured to count a number of times that the circuit mode is switched each time switching to the circuit mode occurs, and to record first information associated with second information in any of storage devices provided in the vehicle,
the first information includes a total number of times that the circuit mode is switched,
the first information is used for failure diagnosis of engine components of the engine, and
the second information includes dates when the circuit mode is switched.

3. The vehicle with the engine according to claim 1, further comprising a display control unit configured to control display of a display device provided in a vehicle cabin of the vehicle,
wherein
the display control unit is configured to change a boundary rotation speed from a first boundary rotation speed to a second boundary rotation speed higher than the first boundary rotation speed, on a basis of the change from the first maximum rotation speed to the second maximum rotation speed,
the boundary rotation speed is a speed between a first meter display region and a second meter display region on a high rotation speed side adjacent to the first meter display region, and
the first and second meter display regions indicate a rotation speed of the engine.

4. The vehicle with the engine according to claim 2, further comprising a display control unit configured to control display of a display device provided in a vehicle cabin of the vehicle,
wherein
the display control unit is configured to change a boundary rotation speed from a first boundary rotation speed to a second boundary rotation speed higher than the first boundary rotation speed, on a basis of the change from the first maximum rotation speed to the second maximum rotation speed, the boundary rotation speed is a speed between a first meter display region and a second meter display region on a high rotation speed side adjacent to the first meter display region, and the first and second meter display regions indicate a rotation speed of the engine.

\* \* \* \* \*